(12) United States Patent
Rizvi et al.

(10) Patent No.: US 10,860,364 B2
(45) Date of Patent: Dec. 8, 2020

(54) CONTAINERIZED MANAGEMENT SERVICES WITH HIGH AVAILABILITY

(71) Applicant: VMWARE, INC., Palo Alto, CA (US)

(72) Inventors: Ammar Rizvi, Bangalore (IN); Krishnendu Gorai, Bangalore (IN); Aakash Bhattacharya, Bangalore (IN); Saket Singh, Bangalore (IN); Dinesh Sharma, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 74 days.

(21) Appl. No.: 16/381,018

(22) Filed: Apr. 11, 2019

(65) Prior Publication Data

US 2020/0233691 A1    Jul. 23, 2020

(30) Foreign Application Priority Data

Jan. 23, 2019  (IN) .............................. 201941002811

(51) Int. Cl.
| | | |
|---|---|---|
| G06F 9/46 | (2006.01) | |
| G06F 9/455 | (2018.01) | |
| G06F 9/50 | (2006.01) | |
| G06F 9/54 | (2006.01) | |
| G06F 11/20 | (2006.01) | |
| G06F 11/14 | (2006.01) | |
| G06F 11/30 | (2006.01) | |

(52) U.S. Cl.
CPC ........ *G06F 9/45558* (2013.01); *G06F 9/5077* (2013.01); *G06F 9/545* (2013.01); *G06F 11/1402* (2013.01); *G06F 11/203* (2013.01); *G06F 11/301* (2013.01); *G06F 2009/45595* (2013.01)

(58) Field of Classification Search
CPC .... G06F 9/45558; G06F 9/5077; G06F 9/545; G06F 2009/45595; G06F 11/1402; G06F 11/203; G06F 11/301
USPC ......................................................... 718/104
See application file for complete search history.

(56) References Cited

U.S. PATENT DOCUMENTS

| | | | |
|---|---|---|---|
| 2016/0085580 A1* | 3/2016 | Toeroe | G06F 9/45558 718/1 |
| 2017/0244593 A1* | 8/2017 | Rangasamy | H04L 67/1097 |
| 2018/0074909 A1* | 3/2018 | Bishop | G06F 11/1466 |
| 2019/0102157 A1* | 4/2019 | Caldato | G06F 21/602 |
| 2020/0044945 A1* | 2/2020 | Lee | H04L 41/5051 |

* cited by examiner

*Primary Examiner* — Diem K Cao

(57) ABSTRACT

In one example, a management service may be deployed in a first container. Further, a shadow service corresponding to the management service may be generated in the first container. Furthermore, network traffic may be routed to an active one of the management service and the shadow service, via a watchdog service in the first container, to provide high availability at a service level.

20 Claims, 4 Drawing Sheets

CONTAINERIZED MANAGEMENT SERVICES WITH HIGH AVAILABILITY

TECHNICAL FIELD

The present disclosure relates to cloud computing environments, and more particularly to methods, techniques, and systems for containerizing management services to provide high availability at a service level.

BACKGROUND

In cloud computing environments, various centralized management services or tools may exist to manage virtual machines and physical servers centrally in virtual computing environments. Virtual-machine technology may abstract the hardware resources and interfaces of a computer system on behalf of one or multiple virtual machines, each comprising one or more application programs and an operating system. The recent emergence of cloud computing services can provide abstract interfaces to enormous collections of geographically dispersed data centers, allowing computational service providers to develop and deploy complex Internet-based services that execute in tens or hundreds of physical servers through abstract cloud-computing interfaces. In such cloud computing environments, the centralized management services may be communicatively coupled together and act as a single platform for managing the virtualization infrastructure. Example centralized management services may include virtual machine provisioning services, host and virtual machine configuration services, resources and virtual machine inventory management services, alarms and event management services, and the like.

Figure 1:
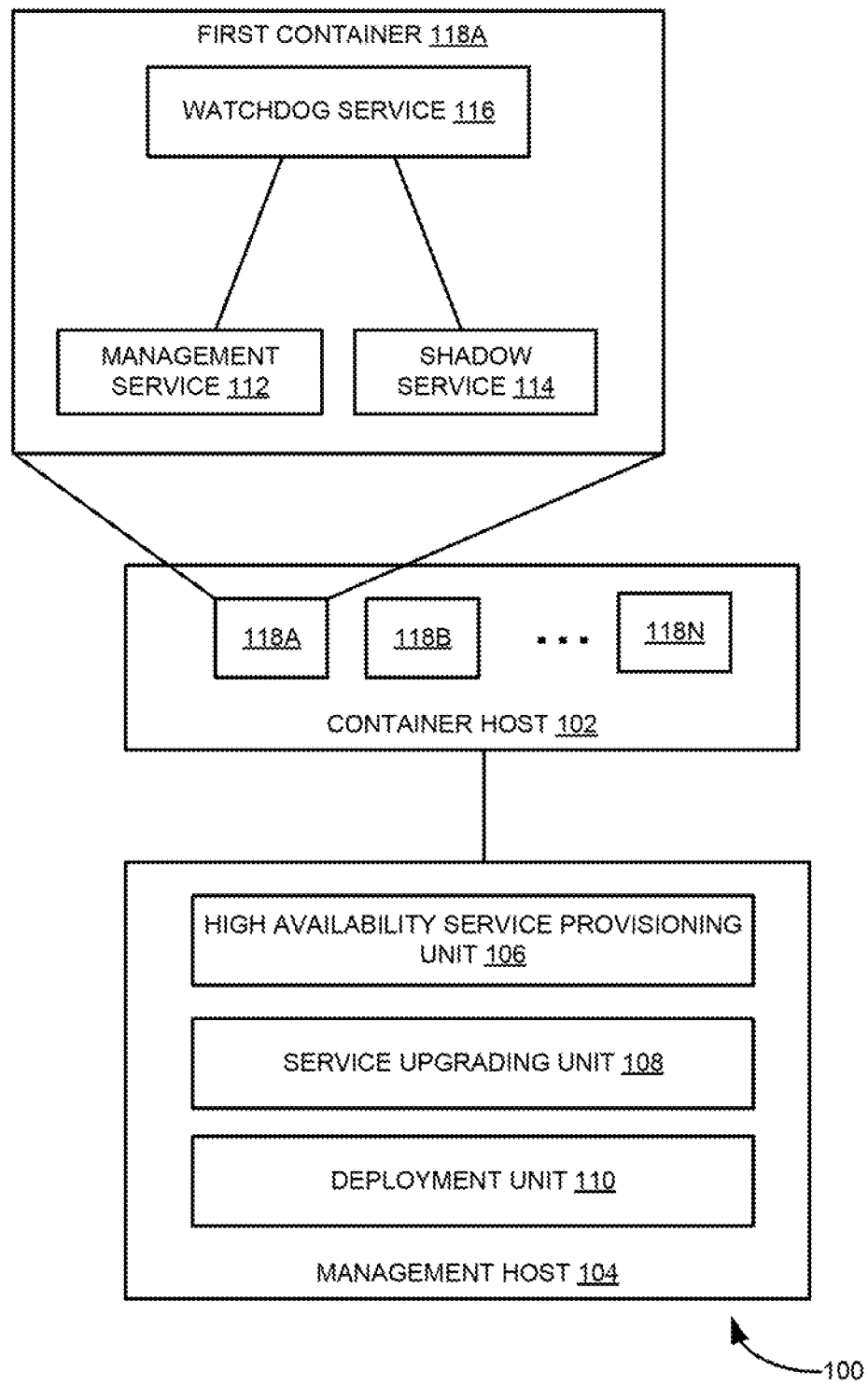
FIG. 1 is a block diagram of an example system, including a management host for containerizing management services.

The drawings described herein are for illustration purposes only and are not intended to limit the scope of the present subject matter in any way.

DETAILED DESCRIPTION

Examples described herein may provide an enhanced method, technique, and system for containerizing management services to provide high availability at a service level in a data center. The data center may be a virtual data center (e.g., a cloud computing environment, a virtualized environment, and the like). The virtual data center may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual data center may be a virtual representation of a physical data center, complete with servers, storage clusters, and networking components, all of which may reside in virtual space being hosted by one or more physical data centers.

Further, such data centers may be monitored and managed using a centralized management application. VMware® vCenter server is an example for the centralized management application. The centralized management application may provide a centralized platform for management, operation, resource provisioning, and performance evaluation of virtual machines and host computing systems in a distributed virtual data center. For example, centralized management application may include multiple management services to aggregate physical resources from multiple servers and to present a central collection of flexible resources for a system administrator to provision virtual machines in the data center.

In such a multi-service architecture, the management services may be dependent on each other. In this example, when one of the management services goes down, the whole system (e.g., vCenter) may go down. In some examples, the management services may be manually or automatically restarted to bring-up the management services, which may lead to service downtime. Further, when a bug arises in one of the management services, it may be a challenge to detect a management service causing an issue as the management services are interdependent. Thus, the multi-service architecture may not provide high availability at a service level. Further, lifecycle of management services may be coupled with the lifecycle of the centralized management application itself. Thus, it may be difficult to patch individual management services as the lifecycle of the management services are tied to the lifecycle of the system. In some examples, updating may have to be preplanned. In this example, a maintenance window may cause planned downtime. On the other hand, upgradation of the whole system may be time consuming and may result in system downtime.

Examples described herein may containerize a management service and generate a shadow service corresponding to the management service to provide high availability at a service level. Further, examples described herein may enable to individually upgrade the management services with near-zero downtime rather than upgrading the whole system. Further, examples described herein may provide ownership to each of the management services, which may lead to resolving issues in the management services in a short span of time and with significantly lesser resources. Thus, examples described herein may containerize the management services so that each management service can have its own independent lifecycle, which facilitates customers a near-zero downtime in case of a management service failure or while upgrading management services and may provide a better user experience.

System Overview and Examples of Operation

FIG. 1 is a block diagram of an example system 100, including a management host 104 for containerizing management services. System 100 may include a container host 102. Example container host 102 may be a physical server or a virtual machine. In one example, container host 102 may include compute, network, and storage resources such as central processing unit (CPU), memory, network interface cards (NICs), storage, and the like. Further, system 100 may include multiple containers 118A-118N running on container host 102. The term "containers" may refer to software instances that enable virtualization at an operating system (OS) level. That is, with containerization, the kernel of the OS that manages container host 102 can provide multiple isolated user space instances. These instances, referred to as containers 118A-118N, appear as unique servers from the standpoint of an end user that communicates with containers 118A-118N via a network (e.g., Internet). However, from the standpoint of the OS that manages container host 102 on which containers 118A-118N execute, containers 118A-118N may be user processes that are scheduled and dispatched by the OS.

Further, each container (e.g., 118A-118N) may provide an executable environment with a complete filesystem. The filesystem may contain code, runtime, system tools, system libraries, and so on. That is, execution of container (e.g., 118A-118N) can be the same regardless of the underlying infrastructure. A "Docker" is one of the popular existing platforms for creating, migrating, managing, and deploying containers. Furthermore, containers 118A-118N may claim resources (e.g., central processing unit (CPU), memory, and the like), compete for resources, and die at the lack of resources. In one example, containers 118A-118N may be served using a container orchestrator such as Kubernetes® or Docker Swarm®, which manages the lifecycle of containers 118A-118N. Thus, the container orchestrator may automatically deploy, scale, and manage containers 118A-118N. Example container orchestrator may manage the life cycle of the containers 118A-118N.

Further, example system 100 may include management host 104 communicatively coupled to container host 102. Management host 104 may refer to a computing device, or computer program (i.e., executing in a computing device), that provides some service, for instance, to manage containers 118A-118N. Management host 104 and container host 102 may run on a same physical computing device or different physical computing devices.

As shown in FIG. 1, management host 104 may include a high availability service provisioning unit 106, a service upgrading unit 108, and a deployment unit 110. In some examples, high availability service provisioning unit 106, service upgrading unit 108, and deployment unit 110 can be implemented on different servers. One skilled in the art can appreciate that high availability service provisioning unit 106, service upgrading unit 108, and deployment unit 110 can also be provided in a virtual machine or virtual application that can run on any host computing system.

In one example, high availability service provisioning unit 106 may deploy a management service 112 in a first container (e.g., 118A). Example management service 112 may be part of a centralized management application. Example management service 112 may be virtual machine provisioning service (e.g., to guide and automate the provisioning of virtual machines and their resources), resources and virtual machine inventory management service (e.g., to organize virtual machines and resources in the virtual environment and facilitates their management), alarms and event management service (e.g., to track and warn users on potential resource overuse or event conditions), and the like. Further, high availability service provisioning unit 106 may generate a shadow service 114 corresponding to management service 112 in first container 118A. Example shadow service 114 may include similar functionality as of management service 112. Thus, there can be two instances of management service 112 running in first container 118A. During operation, high availability service provisioning unit 106 may enable a watchdog service 116 in first container 118A to monitor and route network traffic to an active one of management service 112 and shadow service 114 to provide the high availability at a service level. Example operation or functionality of watchdog service 116 is described in FIG. 2.

Further, service upgrading unit 108 may independently upgrade management service 112 by replacing first container 118A with a second container having an updated docker image corresponding to an updated management service. In one example, service upgrading unit 108 may enable deployment unit 110 to deploy the second container having the updated docker image that corresponds to the updated management service and an updated shadow service. Thus, containerizing management services may enable to update the management services by querying an artifactory and update the docker image, instead of waiting for the centralized management application's next release. Independently upgrading management service 112 is described in FIGS. 3 and 4.

In some examples, the functionalities described herein, in relation to instructions to implement functions of high availability service provisioning unit 106, service upgrading unit 108, deployment unit 110, and any additional instructions described herein in relation to the storage medium, may be implemented as engines or modules comprising any combination of hardware and programming to implement the functionalities of the modules or engines described herein. The functions of high availability service provisioning unit 106, service upgrading unit 108, and deployment unit 110 may also be implemented by a respective processor. In examples described herein, the processor may include, for example, one processor or multiple processors included in a single device or distributed across multiple devices. In some examples, high availability service provisioning unit 106, service upgrading unit 108, and deployment unit 110 can be a part of management software (e.g., vCenter that is offered by VMware®).

Figure 2:
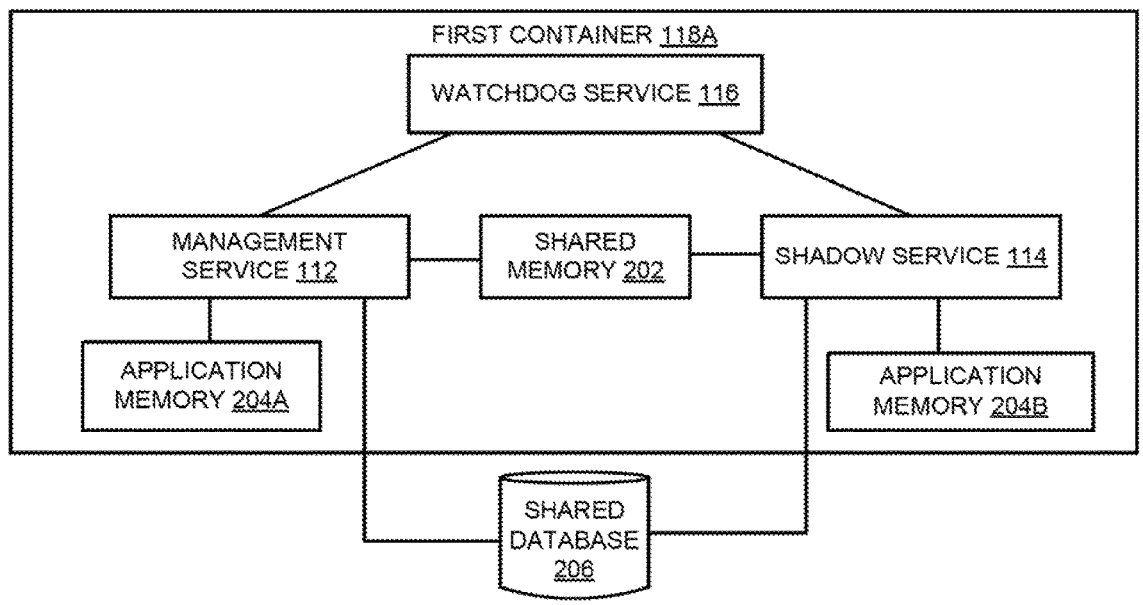
FIG. 2 is a block diagram of a first container illustrating functionality of a watchdog service in the first container to provide high availability at a service level.

FIG. 2 is a block diagram of first container 118A of FIG. 1 illustrating functionality of watchdog service 116 of first container 118A to provide high availability at a service level. Similarly named elements of FIG. 2 may be similar in function and/or structure to elements described in FIG. 1. Example first container 118A may include management service 112 and corresponding shadow service 114. In one example, management service 112 and shadow service 114 are to store a shared state in a shared memory 202. Example shared state may include shared configuration data associated with management service 112 and shadow service 114. Further, management service 112 and shadow service 114 may include separate application memories 204A and 204B, respectively. Furthermore, management service 112 and shadow service 114 may access a shared database 206 to execute a service request, for instance. For example, shared memory 202 and application memories 204A and 204B may be part of first container 118A and shared database 206 may be externally connected to first container 118A, which may be accessed by management service 112 and shadow service 114.

In one example, management service 112 and shadow service 114 may run in an active mode and a passive mode, respectively or vice versa. Further, watchdog service 116 may route network traffic to an active one of management service 112 and shadow service 114. In one example, watchdog service 116 may initialize alongside management service 112 at runtime. Consider that management service 112 and shadow service 114 are in the active mode and the passive mode, respectively. During operation, watchdog service 116 may detect a failure associated with management service 112. Upon detecting the failure of management service 112, watchdog service 116 may route the network traffic to shadow service 114 to provide high availability at the service level. Further, watchdog service 116 may restart management service 112. Upon successful restart of the management service, watchdog service 116 may route back the network traffic to the management service 112. In other examples, when watchdog service 116 goes down, first container 118A may be restarted. Thus, examples described herein may containerize management services. Further, each management service may run inside a container, which in turn will run inside a pod, and pods' state can be monitored through a service orchestrator allowing for high availability of pods. A pod may refer to a group of related containers.

Figure 3:
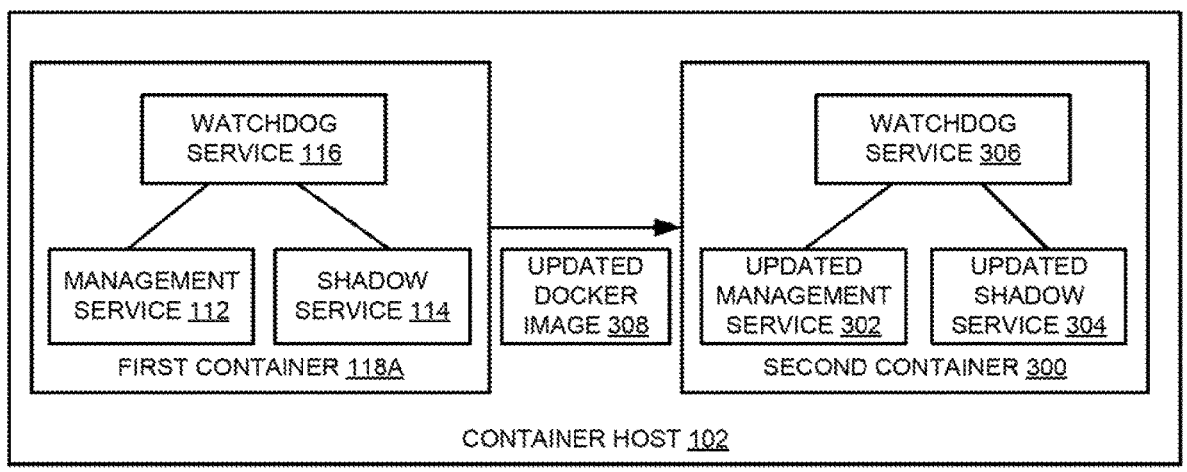
FIG. 3 is a block diagram of a container host illustrating independently upgrading a management service by replacing a first container with a second container.

FIG. 3 is a block diagram of container host 102 of FIG. 1, illustrating independently upgrading management service 112 of FIG. 1 by replacing first container 118A with a second container 300. Similarly named elements of FIG. 3 may be similar in function and/or structure to elements described in FIG. 1. In one example, service upgrading unit 108 of FIG. 1 may independently upgrade management service 112 by replacing first container 118A with second container 300 having an updated docker image 308 that corresponds to an updated management service 302 and a corresponding updated shadow service 304. Thus, second container 300 may include updated management service 302 and updated shadow service 304.

In one example, upon deploying second container 300, network traffic may be routed to second container 300. During operation, a watchdog service 306 in second container 300 may route the network traffic to an active one of updated management service 302 and updated shadow service 304. Further, first container 118A may be decommissioned upon successfully routing the network traffic to second container 300.

Figure 4:
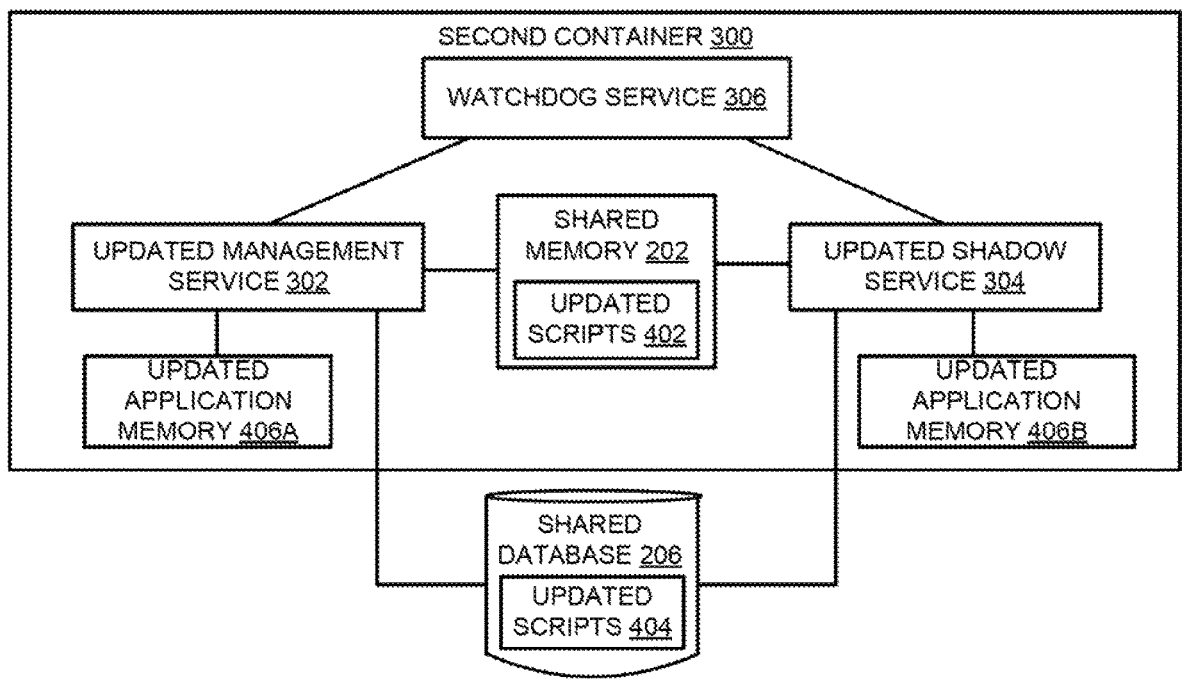
FIG. 4 is a block diagram of the second container of FIG. 3, depicting an upgraded version of the first container of FIG. 3.

FIG. 4 is a block diagram of second container 300 of FIG. 3, depicting an upgraded version of first container 118A of FIG. 3. Similarly named elements of FIG. 4 may be similar in function and/or structure to elements described in FIG. 3. In one example, service upgrading unit 108 of FIG. 1 may update shared database 206 of FIG. 2 associated with first container 118A of FIGS. 2 and 3 with an updated database script (e.g., shared database 206 with updated scripts 404) associated with an updated management service 302 while management service 112 is using shared database 206. In this example, management service 112 may use shared database 206 while updating shared database 206 is carried out. In one example, shared database 206 may be backward compatible.

Further, service upgrading unit 108 may deploy second container 300 having updated docker image 308 that corresponds to updated management service 302 and updated shadow service 304. In one example, second container 300 may access shared database 206 with updated scripts 404. Furthermore, the network traffic may be routed to an active one of updated management service 302 and updated shadow service 304 via watchdog service 306 in second container 300. In one example, updated management service 302 and updated shadow service 304 may access shared memory 202 with updated scripts 402, where updated configuration data may be stored, for instance. Further, updated management service 302 and updated shadow service 304 may include corresponding updated application memories 406A and 406B.

Examples described herein may be implemented in software solutions related to a centralized management application like VMware® vCenter, where examples described herein may containerize management services to provide high availability at a service level and also to upgrade the management services with near-zero downtime.

Example Processes

Figure 5A:
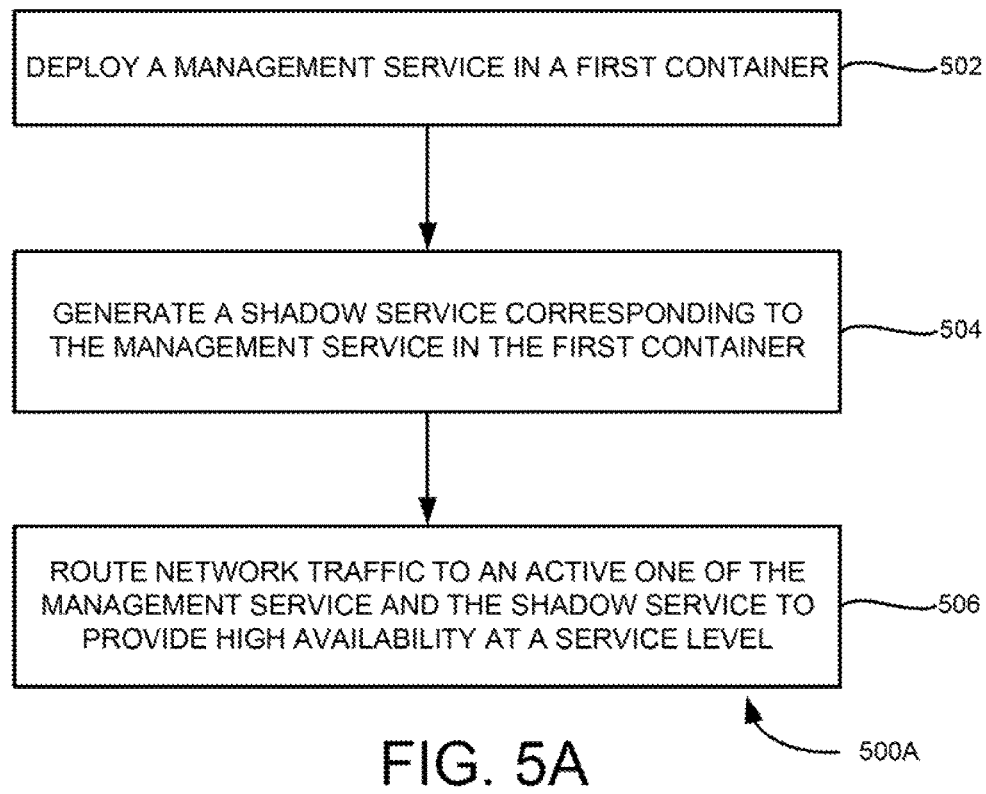
FIG. 5A is an example flow diagram illustrating containerizing management services to provide high availability at a service level.
Figure 5B:
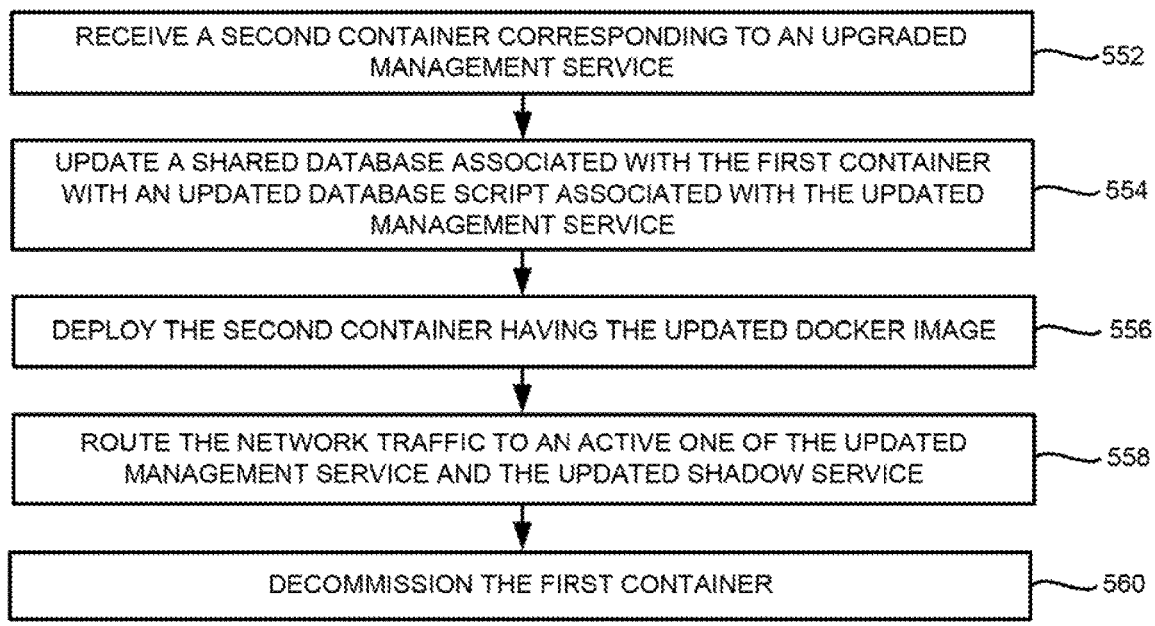
FIG. 5B is an example flow diagram illustrating a method for independently upgrading a management service.

FIG. 5A is an example flow diagram 500A illustrating containerizing management services to provide high availability. FIG. 5B is an example flow diagram 500B illustrating a method for independently upgrading a management service. It should be understood that the process depicted in FIG. 5 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

Referring to FIG. 5A, at 502, a management service may be deployed in a first container. At 504, a shadow service corresponding to the management service may be generated in the first container. In one example. the management service and the shadow service may run in an active mode and a passive mode, respectively or vice versa. Further, the management service and the shadow service may store a shared state in a shared memory. The management service and the shadow service may access a shared database. The management service and the shadow service may include separate application memories At 506, network traffic may be routed to an active one of the management service and the shadow service to provide high availability at a service level routing via a watchdog service in the first container. In one example, routing the network traffic to the active one of the management service and the shadow service may include detecting a failure associated with the management service when the management service is in an active mode and routing the network traffic to the shadow service upon detecting the failure of the management service to provide the high availability. In one example, the management service in the first container may be restarted. Further, the network traffic may be routed back to the management service upon successful restart of the management service.

In one example, the management service may be independently upgraded by replacing the first container with a second container having an updated docker image corresponding to an updated management service. For example, referring to FIG. 5B, at 552, a second container corresponding to an upgraded management service and an updated shadow service may be received. At 554, a shared database associated with the first container may be updated with an updated database script associated with the updated management service while the management service is using the shared database. The shared database may be backward compatible. At 556, the second container having the updated docker image that corresponds to the updated management service and an updated shadow service may be deployed on a container host. The second container may have access to the updated shared database. At 558, the network traffic may be routed to an active one of the updated management service and the updated shadow service via a watchdog service in the second container. At 560, the first container may be decommissioned upon successfully routing the network traffic to the second container.

Figure 6:
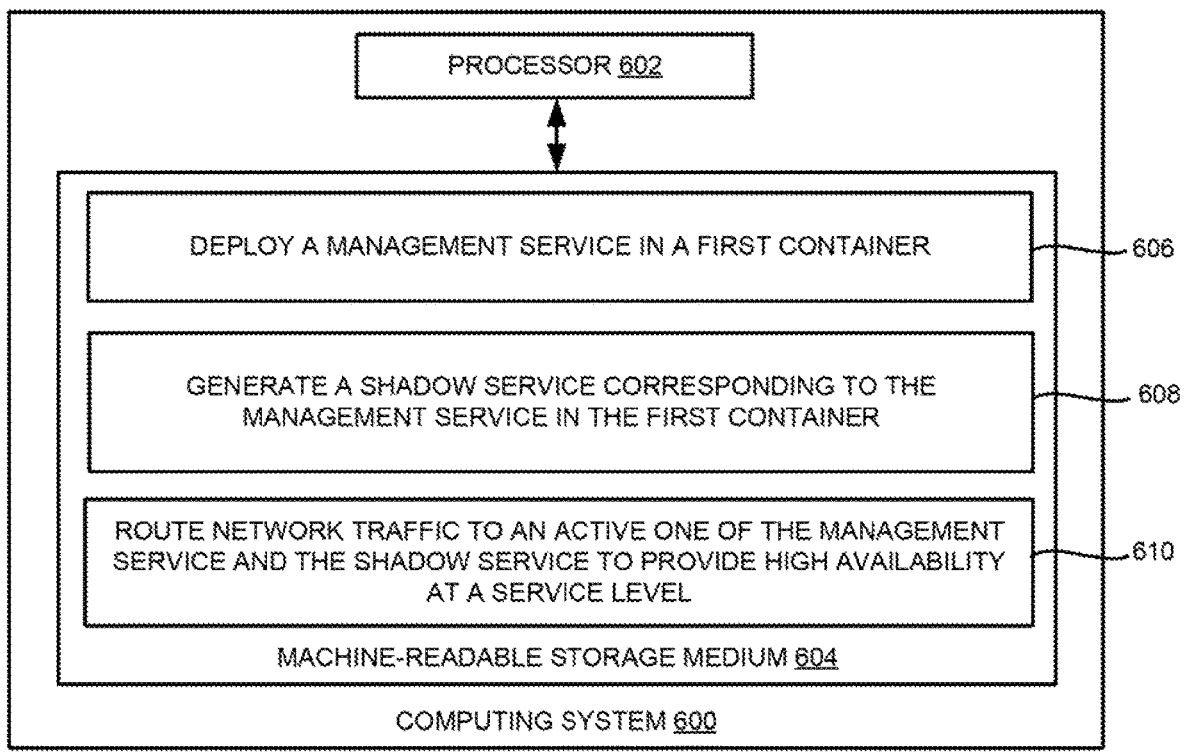
FIG. 6 is a block diagram of an example computing device including non-transitory machine-readable storage medium storing instructions to containerize management services to provide high availability at a service level.

FIG. 6 is a block diagram of an example computing device 600 including non-transitory machine-readable storage medium 604 storing instructions to containerize management services to provide high availability at a service level. Computing system 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to computing system 600.

Machine-readable storage medium 604 may store instructions 606-610. In an example, instructions 606-610 may be executed by processor 602 to containerize the management services to provide the high availability at the service level. Instructions 606 may be executed by processor 602 to deploy a management service in a first container. Instructions 608 may be executed by processor 602 to generate a shadow service corresponding to the management service in the first container. Further, instructions 610 may be executed by processor 602 to route network traffic to an active one of the management service and the shadow service to provide the high availability at the service level.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
   deploying a management service in a first container;
   generating a shadow service corresponding to the management service in the first container; and
   routing, by a watchdog service in the first container, network traffic to an active one of the management service and the shadow service to provide high availability at a service level.

2. The method of claim 1, wherein the management service and the shadow service run in an active mode and a passive mode, respectively or vice versa.

3. The method of claim 1, wherein routing the network traffic to the active one of the management service and the shadow service comprises:
   detecting, by the watchdog service, a failure associated with the management service when the management service is in an active mode; and
   routing the network traffic to the shadow service upon detecting the failure of the management service to provide the high availability.

4. The method of claim 3, further comprising:
   restarting, by the watchdog service, the management service in the first container; and
   routing back the network traffic to the management service upon successful restart of the management service.

5. The method of claim 1, further comprising:
   independently upgrading the management service by replacing the first container with a second container having an updated docker image corresponding to an updated management service.

6. The method of claim 5, wherein independently upgrading the management service comprises:
   updating a shared database associated with the first container with an updated database script associated with the updated management service while the management service is using the shared database, wherein the shared database is backward compatible;
   deploying the second container having the updated docker image that corresponds to the updated management service and an updated shadow service, wherein the second container is to have access to the updated shared database; and routing the network traffic to an active one of the updated management service and the updated shadow service via a watchdog service in the second container.

7. The method of claim 6, further comprising:
decommissioning the first container upon successfully routing the network traffic to the second container.

8. The method of claim 1, wherein the management service and the shadow service are to store a shared state in a shared memory, wherein the management service and the shadow service are to access a shared database, and wherein the management service and the shadow service comprise separate application memories.

9. A system comprising:
a container host;
a first container running on the container host; and
a management host communicatively coupled to the container host, wherein the management host comprises a high availability service provisioning unit to:
deploy a management service in the first container; and
generate a shadow service corresponding to the management service in the first container; and
enable a watchdog service in the first container to monitor and route network traffic to an active one of the management service and the shadow service to provide high availability at a service level.

10. The system of claim 9, wherein the watchdog service in the first container is to:
detect a failure associated with the management service when the management service is in an active mode; and
route the network traffic to the shadow service upon detecting the failure of the management service to provide the high availability.

11. The system of claim 10, wherein the watchdog service in the first container is to:
restart the management service in the first container; and
route back the network traffic to the management service upon successful restart of the management service.

12. The system of claim 9, wherein the management host further comprises a service upgrading unit to:
independently upgrade the management service by replacing the first container with a second container having an updated docker image corresponding to an updated management service.

13. The system of claim 12, wherein the service upgrading unit is to:
update a shared database associated with the first container with an updated database script associated with the updated management service while the management service is using the shared database, wherein the shared database is backward compatible;
enable a deployment unit in the management host to deploy the second container having the updated docker image that corresponds to the updated management service and an updated shadow service, wherein the second container is to have access to the updated shared database; and
initialize one of the updated management service and the updated shadow service such that a watchdog service in the second container is to route the network traffic to an active one of the updated management service and the updated shadow service.

14. The system of claim 13, wherein the deployment unit is to:

decommission the first container upon successfully routing the network traffic to the second container.

15. The system of claim 9, further comprising
a shared memory to store a shared state of the management service and the shadow service;
a shared database accessed by the management service and the shadow service; and
a first application memory and a second application memory associated with the management service and the shadow service, respectively.

16. A non-transitory machine-readable storage medium encoded with instructions that, when executed by a processor of a computing system, cause the processor to:
deploy a management service in a first container;
generate a shadow service corresponding to the management service in the first container; and
route network traffic to an active one of the management service and the shadow service to provide high availability at a service level.

17. The non-transitory machine-readable storage medium of claim 16, wherein the instructions to route the network traffic to the active one of the management service and the shadow service comprises instructions to:
detect a failure associated with the management service when the management service is in an active mode; and
route the network traffic to the shadow service upon detecting the failure of the management service to provide the high availability.

18. The non-transitory machine-readable storage medium of claim 17, further comprising instructions, when executed by the processor of the computing system, cause the processor to:
restart the management service in the first container; and
route back the network traffic to the management service upon successful restart of the management service.

19. The non-transitory machine-readable storage medium of claim 16, further comprising instructions, when executed by the processor of the computing system, cause the processor to:
independently upgrade the management service by replacing the first container with a second container having an updated docker image corresponding to an updated management service.

20. The non-transitory machine-readable storage medium of claim 19, wherein the instructions to independently upgrade the management service comprises instructions to:
update a shared database associated with the first container with an updated database script associated with the updated management service while the management service is using the shared database, wherein the shared database is backward compatible;
deploy the second container having the updated docker image that corresponds to the updated management service and an updated shadow service, wherein the second container is to have access to the updated shared database;
initialize one of the updated management service and the updated shadow service such that a watchdog service in the second container is to route the network traffic to the active one of the updated management service and the updated shadow service; and
decommission the first container upon successfully routing the network traffic to the second container.

* * * * *